US008873899B2

(12) United States Patent
Anderson et al.

(10) Patent No.: US 8,873,899 B2
(45) Date of Patent: Oct. 28, 2014

(54) MODAL ROTATION IN OPTICAL WAVEGUIDES

(71) Applicant: Cisco Technology, Inc., San Jose, CA (US)

(72) Inventors: Sean P. Anderson, Macungie, PA (US); Mark A. Webster, Bethlehem, PA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 13/828,455

(22) Filed: Mar. 14, 2013

(65) Prior Publication Data

US 2014/0270620 A1  Sep. 18, 2014

(51) Int. Cl.
*G02B 6/14*    (2006.01)
*G02B 6/27*    (2006.01)
*G02B 6/126*   (2006.01)

(52) U.S. Cl.
CPC ............ *G02B 6/27* (2013.01); *G02B 6/2706* (2013.01); *G02B 6/126* (2013.01); *G02B 6/2766* (2013.01); *G02B 6/2773* (2013.01)
USPC .......................................................... 385/11

(58) Field of Classification Search
CPC ........................................................ G02B 6/14
USPC .......................................................... 385/11
See application file for complete search history.

(56) References Cited

U.S. PATENT DOCUMENTS

| | | | | |
|---|---|---|---|---|
| 7,126,749 B2 * | 10/2006 | Heim et al. | ............ | 359/344 |
| 7,228,015 B2 * | 6/2007 | Watts et al. | ............ | 385/11 |
| 8,160,405 B2 * | 4/2012 | Nagarajan et al. | ............ | 385/11 |
| 2008/0019637 A1 | 1/2008 | Little et al. | | |
| 2008/0025665 A1 | 1/2008 | Little | | |
| 2009/0110344 A1 * | 4/2009 | Little et al. | ............ | 385/11 |
| 2010/0074571 A1 * | 3/2010 | Gomyo | ............ | 385/11 |
| 2013/0156361 A1 * | 6/2013 | Kojima et al. | ............ | 385/11 |

FOREIGN PATENT DOCUMENTS

WO   WO 2004/042458 A1   5/2004
WO   WO 2012/087590 A1   6/2012

OTHER PUBLICATIONS

Frederik Van Laere, et al., "Focusing Polarization Diversity Grating Couplers in Silicon-on-Insulator", Journal of Lightwave Technology, vol. 27, No. 5, Mar. 1, 2009, pp. 612-618.
PCT International Search Report and Written Opinion for corresponding application No. PCT/US2014/024015 mailed Jun. 5, 2014.
S.H. Tao, "Optical coupling and splitting with two parallel waveguide tapers", Optics Express, vol. 19, No. 2, Jan. 7, 2011, pp. 906-912.
Tymon Barwicz, et al., "Polarization-transparent microphotonic devices in the strong confinement limit", Nature Photonics, vol. 1, Dec. 21, 2006, pp. 57-60.

(Continued)

*Primary Examiner* — Eric Wong

(74) *Attorney, Agent, or Firm* — Brinks Gilson & Lione

(57) ABSTRACT

An optical waveguide structure includes a rotator having a dual-layer core. A first layer of the dual-layer core may include a tapering portion. A second layer of the dual-layer core may include a rib portion disposed on the tapering portion. The combination of the rib portion and the tapering portion may receive a pair of optical signals, one being polarized in a TE mode and the other being polarized in a TM mode, and convert them to a pair of TE mode optical signals.

20 Claims, 7 Drawing Sheets

(56) References Cited

OTHER PUBLICATIONS

Yunhong Ding et al., "Fabrication tolerant polarization splitter and rotator based on a tapered directional coupler", Optics Express, vol. 20, No. 18, Jun. 26, 2012, pp. 20021-20027.

Daoxin Dai, et al., "Novel ultra-short and ultra-broadband polarization beam splitter based on a bent directional coupler", Optics Express, vol. 19, No. 19, Sep. 8, 2011, pp. 18614-18620.

Jing Zhang, et al., "Silicon waveguide based TE mode converter", Optics Express, vol. 18, No. 24, Nov. 18, 2010, pp. 25264-25270.

Wangqing Yuan, et al., "Mode-evolution-based polarization rotator-splitter design via simple fabrication process", Optics Express, vol. 20, No. 9, Apr. 18, 2012, pp. 10163-10169.

Liu Liu, et al., "Silicon-on-insulator polarization splitting and rotating device for polarization diversity circuits", Optics Express, vol. 19, No. 13, Jun. 15, 2011, pp. 12646-12651.

Daoxin Dai, et al., "Novel concept for ultracompact splitter-rotator based on silicon nanowires", Optics Express, vol. 19, No. 11, May 20, 2011, pp. 10940-10949.

Winnie N. Ye, et al., "Wavelength Independent Soi Polarization Splitter Based on Zero-order Arrayed Waveguide Gratings", Institute for Microstructural Sciences, National Research Council, IEEE, 2007.

Hiroshi Fukuda, et al., "Ultrasmall polarization splitter based on silicon wire waveguides", Optics Express, vol. 14, No. 25, Nov. 28, 2006, pp. 12401-12408.

Long Chen, et al., "Compact polarization rotator on silicon for polarization-diversified circuits", 2011 Optical Society of America, vol. 36, No. 4, Feb. 4, 2011, pp. 469-471.

Frederik Van Laere, et al., "Focusing Polarization Diversity Grating Couplers in Silicon-onInsulator", Journal of Lightwave Technology, vol. 27, No. 5, Mar. 1, 2009, pp. 612-618.

G. Roelkens, et al., "Grating-Based Optical Fiber Interfaces for Silicon-on-Insulator Photonic Integrated Circuits", IEEE Journal of Selected Topics in Quantum Electronics, vol. 17, No. 3, May/Jun. 2011, pp. 571-580.

Dirk Taillaert, et al., "A Compact Two-Dimensional Grating Coupler Used as a Polarization Splitter", IEEE Photonics Technology Letters, vol. 15, No. 9, Sep. 2003, pp. 1249-1251.

* cited by examiner

US 8,873,899 B2

MODAL ROTATION IN OPTICAL WAVEGUIDES

TECHNICAL FIELD

The present disclosure relates generally to optical waveguides, and more particularly to optical waveguides that convert transverse electric (TE) and transverse magnetic (TM) polarizations into separate TE modes.

BACKGROUND

Optical or light signals carrying information may be transmitted over optical communication links, such as fiber optic cables. Two optical signals may be transmitted together in orthogonal transverse modes or in an orthogonal arrangement of "s" and "p" polarized light. Optical integrated circuits may receive the optical signals and perform functions on the optical signals. Some optical integrated circuits may only be able to perform functions on optical signals that are only polarized in one type of transverse mode. As such, the polarization states of the optical signals may need to be modified before or after processing.

DETAILED DESCRIPTION

Overview

Figure 1:
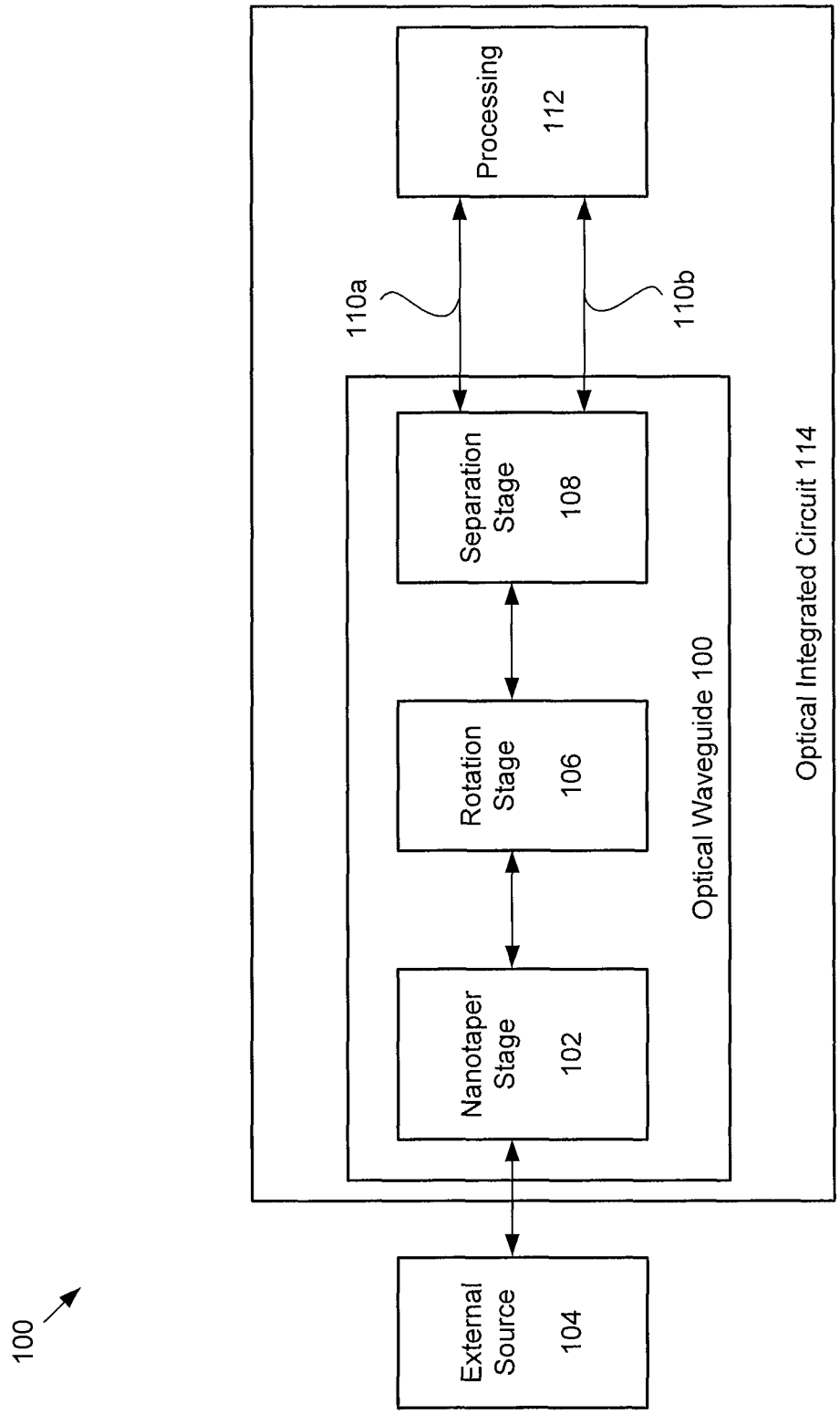
FIG. 1 illustrates an example block diagram of various stages of an optical waveguide structure.

An apparatus may include an optical waveguide structure configured to transmit a pair of optical signals in guided modes. The optical waveguide structure may include a rotator that is configured to receive a pair of optical signals that includes a first optical signal and a second optical signal. The first optical signal may be polarized in a transverse electric (TE) mode and be maintained in the TE mode as the first optical signal propagates through the rotator. The second optical signal may be polarized in a transverse magnetic (TM) mode and be converted to a TE mode optical signal as the second optical signal propagates through the rotator. The rotator may include a dual-layer core having a first layer disposed on a substrate and a second layer disposed on the first layer. The first layer may include a base portion that inversely tapers from a first end to a second end, where the first end has a width that is less than a width of the second end. The second layer may include a rib portion that has a width that is less than the width of the base portion at the first end and the width of the tapering structure at the second end.

Description of Example Embodiments

The present disclosure describes an optical waveguide structure that is configured to convert a light or optical signal polarized in a transverse electric (TE) mode and a light or optical signal polarized in a transverse magnetic (TM) mode into optical signals having separate TE modes. A TE mode optical signal may be polarized such that it has no electric field along an axis perpendicular to its direction of propagation. A TM mode optical signal may be polarized such that it has no magnetic field in the direction of propagation and/or along that same axis. In addition, for applications using optical chips, a TE mode optical signal may have its electric field polarized in the same or substantially the same plane as the chip, and a TM mode optical signal may have its electric field polarized in a plane perpendicular or substantially perpendicular to the plane of the chip. The optical waveguide may include a nanotaper that couples optical signals received from an external source and concentrates them to TE mode and TM mode optical signals in the optical waveguide. The optical waveguide may also include a rotator that maintains the TE mode optical signal in the TE mode and converts or rotates the TM mode optical signal to a TE mode optical signal. The TE mode optical signal converted from the TM mode optical signal may have a different order than the TE mode optical signal that was maintained in the TE mode while propagating through the rotator. The optical waveguide may also include a separator that separates the converted TE mode optical and the maintained TE mode optical signal into separate optical waveguide paths.

The optical waveguide structure may be located "on chip" or included as part of an optical integrated circuit (IC) that is configured to process or perform functions on optical signals carrying information, such as modulation, bending light, coupling, and/or switching, as examples. The optical IC may not be configured to support TM mode optical signals, or may only be configured to support TE mode optical signals. That is, the optical IC may be unable to process or perform its functions on optical signals polarized in the TM mode or modes other than the TE mode. Yet, the optical IC may receive from an external source two optical signals that are transmitted to the optical IC. The optical signals may be orthogonally polarized in different transverse modes or in different combinations of "s" and "p" polarized light. Additionally, the optical signals may be transmitted together or substantially simultaneously. Alternatively, the signals may be polarized in only one polarization, and the precise or exact polarization may be unknown by the optical IC. When the optical IC receives the optical signals, one of the signals may be confined in the optical IC as a TE mode optical signal and the other signal may be confined in the optical IC as a TM mode optical signal. Similarly, two optical signals processed by the optical IC may be converted following processing so that one signal is polarized as a TE mode optical signal and the other is polarized as a TM mode optical signal so that the two optical signals may be transmitted to an external source as orthogonal "s" and "p" polarized light. The optical waveguide structure may serve or function as a front end component of the optical IC that provides received optical signals to the downstream processing in supportable TE modes, and/or that receives optical signals in TE modes and changes their polarization arrangement for transmission to an external source.

In alternative applications, the optical IC may not be configured to support TE mode optical signals, or may only be configured to support TM mode optical signals. That is, the optical IC may be unable to process or perform its functions on optical signals polarized in the TE mode or modes other than the TM mode. As such, a pair of orthogonally polarized optical signals received by the optical IC may both be polarized in the TM mode before processing. Similarly, two optical signals processed by the optical IC may be supplied by processing circuitry of the optical IC as TM mode signals, which may be converted following processing so that one signal is polarized as a TE mode optical signal and the other is polarized as a TM mode optical signal for transmission or coupling to an external source as orthogonal "s" and "p" polarized light. For these alternative applications, the optical waveguide structure may serve or function as a front end component of the optical IC that provides received optical signals to the downstream processing in supportable TM modes, and/or that receives optical signals in TM modes and changes their polarization arrangement for transmission to an external source.

The following description describes optical waveguide structures that may be integrated with or used for optical ICs that support TE mode optical mode signals, but not TM mode optical signals. However, the invention may also apply to alternative optical ICs that support TM mode optical signals but not TE mode optical signals, or that support both TE and TM mode optical signals.

FIG. 1 shows a block diagram of an optical waveguide structure 100 having multiple stages to polarize a pair of optical signals received from an external source as a pair of TE mode optical signals, and/or to polarize a pair TE mode optical signals in orthogonal transverse modes for transmission to the external source. A first stage 102 may include a nanotaper that is configured to receive and couple optical signals being transmitted from an external light source 104. The external light source 104 may be any light source or structure that is configured to transmit light or optical signals carrying information, including optical fibers, a free-space source, or a different optical waveguide, as examples. A free-space source may refer generally to a light source or structure that is configured to transmit or carry light in a non-waveguide or unguided manner, such as a laser or a lens or lens system that focuses light, as examples. A different optical waveguide may refer to another or a separate waveguide other than the optical waveguide structure 100, which may include different properties such as material or dimensional differences. In addition or alternatively, a different waveguide may refer to another waveguide structure that is integrated or included in a different optical IC than an optical IC in which the optical waveguide structure 100 is integrated or included, and/or a waveguide structure that is subjected to a different fabrication process. Various configurations or combinations of configurations are possible.

The optical signals being transmitted by the external source 104 may have an associated power, such as in a range of about 0.5 to 1.0 milli-Watts (mW), although other powers may be used. Additionally, the optical signals may have wavelengths that may be in any range or have any length in the optical or light spectrums, including those in the O-band or the C-band, and/or in a range of about 1530 to 1570 nanometers.

The external light source 104 may transmit a pair of optical signals together or simultaneously. The first and second optical signals may be transmitted together by being polarized in different transverse modes or in different combinations of "s" and "p" polarized light. Upon receipt of the first and second optical signals, the nanotaper stage 102 may be configured to confine or concentrate the optical signals to the waveguide structure 100 in guided modes. The guided modes may be different guided modes, which may include the TE mode and the TM mode. By being confined or concentrated, the light is substantially localized or contained within the waveguide structure 100, at least in terms of optical waveguides. As such, as the output or end of the nanotaper stage 102, the first optical signal may be concentrated in the optical waveguide structure 100 as a TE mode optical signal, and the second optical signal may be concentrated in the optical waveguide structure 100 as a TM mode optical signal. In addition, each of the TE mode optical signal and the TM mode optical signal may be of the lowest order (i.e., first order) or be fundamental mode optical signals, which may be referred to as $TE_0$ and $TM_0$ mode optical signals. The order of the mode may refer to and/or be indicative a spatial symmetry of the light energy in the optical signal relative to a central axis of propagation. First order or fundamental optical signals may have a single concentration of light energy centrally located on the axis of propagation.

The optical waveguide structure 100 may further include a rotator stage 106 that is configured to rotate or alter the polarization state of the TM mode optical signal to a TE mode optical signal, and maintain or keep unchanged the TE mode optical signal as a TE mode optical signal. Accordingly, at the output or end of the rotator stage 106, the pair of optical signals initially received at the nanotaper stage 102 may be confined or concentrated to the optical waveguide structure 100 as first and second TE mode optical signals.

The first and second TE mode optical signals may have different orders. For example, the first TE mode optical signal may be the first order $TE_0$ optical signal that is maintained as a TE mode optical signal as it propagates through the rotation stage 106. The second TE mode optical signal may have a higher order than the first order. For example, the second TE mode optical signal may be a second-order TE mode optical signal, which may be referred to as a $TE_1$ mode optical signal. A second-order $TE_1$ mode optical signal may have two concentrations of light energy symmetric about the axis of propagation. As such, the rotation stage 106 may be configured to convert a first-order $TM_0$ mode optical signal to a second-order $TE_1$ optical signal, and maintain the first-order $TE_0$ mode optical signal as a first-order $TE_0$ mode optical signal as the received optical signals propagate through the rotation stage 106.

The optical waveguide structure 100 may further include a separation stage 108 that may be configured to separate the first-order $TE_0$ mode optical signal and the second-order $TE_1$ mode optical signal into separate optical waveguides or waveguide paths. The first-order $TE_0$ mode optical signal and the second-order $TE_1$ mode optical signal may be transmitted to the separation stage 108 together on a single waveguide or waveguide path. So that the $TE_0$ and $TE_1$ mode optical signals may be processed separately, the separation stage 108 may separate and confine the $TE_0$ mode optical signal and the $TE_1$ mode optical signal into separate waveguide paths 110a and 110b. The separation of the $TE_0$ mode optical signal and the $TE_1$ mode optical signal (or more generally the separation of different order optical signals polarized in the same TE or TM mode) into separate waveguide paths may be referred to as modal diversity. After separation, the $TE_0$ mode optical signal and the $TE_1$ mode optical signal may then be transmitted along their respective waveguide paths 110a, 110b to processing circuitry 112, where one or more functions may be performed on each of the $TE_0$ and $TE_1$ mode optical signals. In addition, after separation, the $TE_1$ optical signal may become a first order $TE_0$ mode optical signal when transmitted along its respective waveguide path 110b to the processing circuitry 112.

The above description describes the optical waveguide structure 100 as a receiver that operates to receive optical signals from an external source 104 and provide the optical signals as TE mode optical signals to downstream processing circuitry 112 for processing. In addition or alternatively to being a receiver, the optical waveguide structure 100 may be configured to operate as a transmitter that receives a pair of TE mode optical signals upstream from the processing circuitry 112 and outputs them to an external source 104. In particular, the separation stage 108 may receive a $TE_0$ mode optical signal and a $TE_1$ mode optical signal along respective waveguide paths 110a, 110b and combine them into a single waveguide path. The $TE_0$ and $TE_1$ mode optical signals, combined in a single path, may be supplied to the rotation stage 106, where the $TE_1$ mode optical signal optical may be converted to a $TM_0$ mode optical signal and the $TE_0$ mode optical signal is maintained as a $TE_0$ mode optical signal. The $TE_0$ mode and $TM_0$ mode optical signals may then propagate along the nanotaper stage 102, where they are coupled to the external source 104.

As shown in FIG. 1, the waveguide structure 100 and the processing circuitry 112 may be integrated or included together as part of the same optical integrated circuit 114, in which the external light source 104 communicates optical signals to and/or from the optical integrated circuit 114. In alternative example configurations, the waveguide structure 100 may be a standalone structure or a structure that is separate from the processing circuitry 112 and/or the optical IC 114 on which the processing circuitry 112 may be included.

Figure 2:
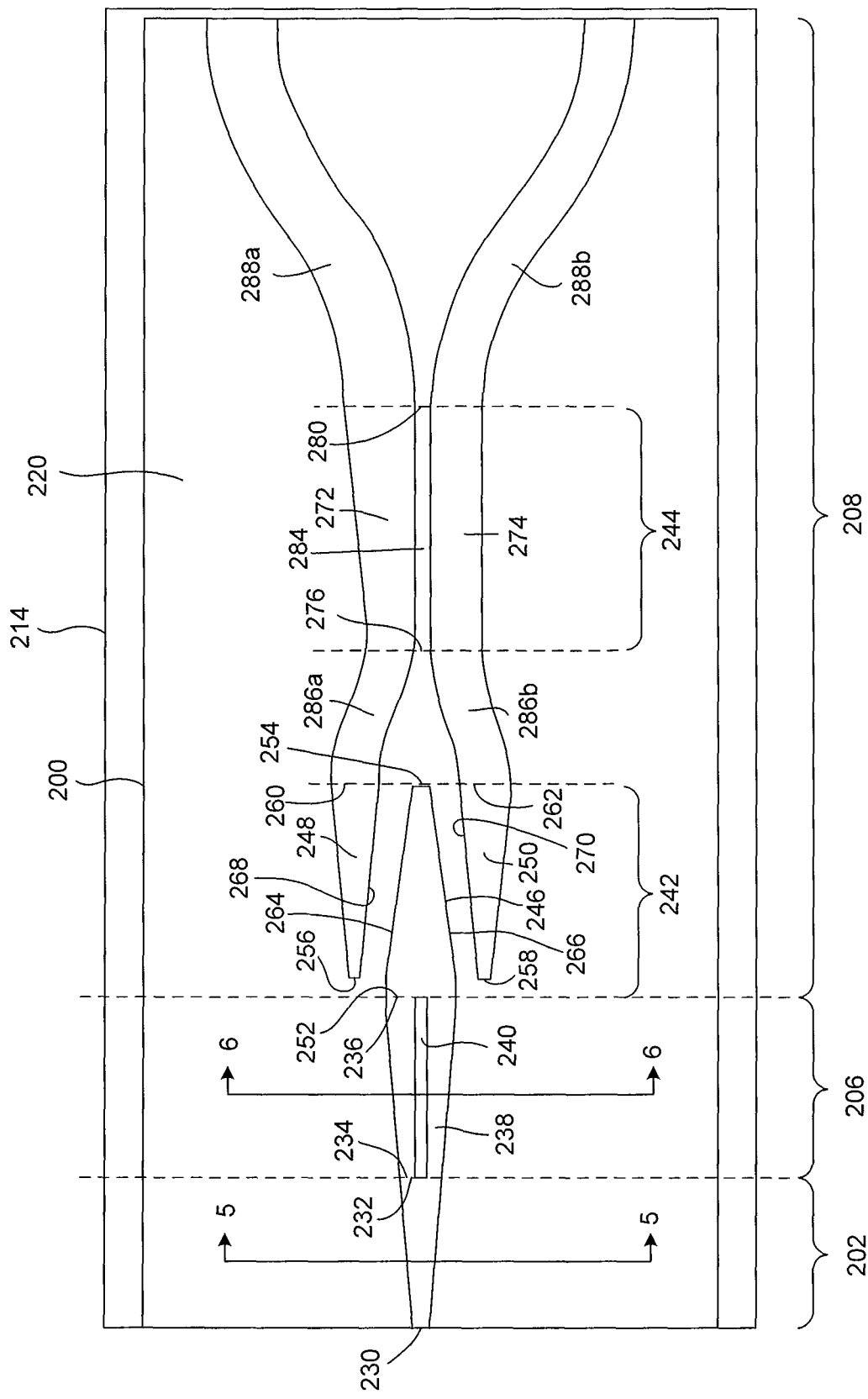
FIG. 2 illustrates a top view of an example optical waveguide structure.

FIG. 2 shows a top view of an example optical waveguide structure 200 that may include or implement the stages 102, 106, and 108 of the waveguide structure 100 shown in FIG. 1. The optical waveguide structure 200 may include and/be included or fabricated on a substrate or buffer 220 of an optical integrated circuit or chip 214.

The optical waveguide structure 200 may include a nanotaper 202 that may couple a pair of orthogonally polarized optical signals received from an external source to the optical waveguide structure 200 and concentrate them as a first-order $TE_0$ mode optical signal and a first-order $TM_0$ mode optical signal. The nanotaper 202, which may also referred to as an inverse taper, may have a first end 230 that may couple the optical signals received from the external source through direct or end-fire coupling. The first end 230, and the nanotaper 220 in general, may be co-planar with the external source, which may be contrasted from a surface normal coupling structure, such as a grating coupler, that couples to external the external source by being perpendicular or surface normal to the external source and/or the incoming light.

The first end 230 may be located at or near (e.g., a couple of microns away from) an edge of the substrate 220 and/or the optical chip 214. In addition, the first end 230 may have a width that matches or approaches a size of the light beams of the optical signals so that the first end 230 appears physically large to the external source and supports the modes of the received optical signals in order to maximize coupling efficiency (or minimize energy loss) of the optical signals. Various factors may be considered to determine the width of the first end 230, including the material of the nanotaper 230 and/or the substrate 220, and the wavelengths of the optical signals. For some example embodiments, such as for some silicon-based optical waveguides, the width of the first end 230 may be less than or equal to about 200 nanometers, although other widths may be used.

The nanotaper 202 may also include a second end 232 that is located opposite the first end 230. The second end 232 may have a width that supports the guided TE and TM modes of the optical waveguide structure 200 so that the pair of optical signals received from the external source are confined to the optical waveguide structure 200 as a TE mode optical signal and a TM mode optical signal as the optical signals propagate through the nanotaper 202 from the first end 230 to the second end 232. In addition, the TE and TM mode optical signals may be confined or concentrated as first-order $TE_0$ and $TM_0$ mode optical signals, as previously described. Various factors, including the materials of the nanotaper 202 and/or substrate 220, as well as the wavelengths of the optical signals, may be considered to determine the width of the second end 232. As shown in FIG. 2, the width of the second end 232 may be greater than the width of the first end 230. In one example, the width may in a range of about 300 to 400 nanometers, although other widths may be used.

The nanotaper 202 may be an adiabatic optical waveguide structure, in which minimal energy loss occurs and high isolation between the pair of optical signals is maintained as the optical signals propagate over the adiabatic structure. To achieve or ensure minimal energy loss and high isolation, the adiabatic structure may have a length over which gradual modal transitions of the optical signals may occur. The length may be significantly greater than the wavelengths of the optical signals, and the closer in index that the modes are, the longer the length may be. In some cases the length may be at least ten times greater than the wavelengths.

The nanotaper 202 may have a length over which the nanotaper 202 may inversely taper from the width of the first end 230 to the width of the second end 232. The length may be sufficient to configure the nanotaper 202 as an adiabatic structure In some example embodiments, the length of the nanotaper 202 may be about 50 micrometers (microns), although other lengths may be used.

The optical waveguide structure 200 may further include a rotator 206 that is configured to convert or rotate the first-order $TM_0$ mode optical signal into a second-order $TE_1$ mode optical signal and maintain the first-order $TE_0$ mode optical signal as a first-order $TE_0$ mode optical signal. The rotator 206 may perform the maintenance and conversion of the $TE_0$ and $TM_0$ mode optical signals, respectively, as the optical signals propagate through the rotator 206 from a first end 234, which abuts or is connected to the second end 232 of the nanotaper 202, to a second end 236. The rotator 206 may have an associated length over which the maintenance and conversion may be performed. Like the nanotaper 202, the rotator 206 may be an adiabatic structure, such that the maintenance and conversion may be performed with minimal loss and high isolation between the optical signals. As such, the rotator 206 may have a sufficient length so that the maintenance and conversion may be performed gradually to ensure minimal loss and high isolation. In some example embodiments, the length of the rotator may be about 50 microns, although other lengths may be used.

The rotator 206 may include a base portion 238 and a rib portion 240. The base portion 238 may be a generally planar structure that that may be co-planar with the nanotaper 202. In addition, the base portion 238 may inversely taper or have a width that increases from the first end 234 to the second end 236. At the first end 234, the width may be equal or substantially equal to the width of the nanotaper 202 at the nanotaper's second end 234, which may be in a range of 300-400 nanometers in some examples. The width of the rotator 206 at the second end 236 may increase to about 1 micrometer in some examples, although other widths may be used.

The rib portion 240 of the rotator 206 may be a relatively thin strip of material that is disposed on or that extends or protrudes from a planar surface of the base portion 238 that is opposite an opposing planar surface in contact with the substrate 220. As shown in FIG. 2, the rib portion 240 may extend an entire length of the rotator 206, from the first end 234 to the second end 236, and substantially in the direction of propagation. In alternative example configurations, the rib portion 240 may not extend the entire length of the rotator 206. In still other example configurations, the rib portion 240 may extend over the nanotaper 202 so that at least a portion of the nanotaper 202 includes a rib portion extending from a planar surface of the nanotaper 202.

The rib portion 240 may have a width that is less or substantially less than any of the widths of the base portion 238. In some example configurations, the width of the rib portion 240 may be substantially uniform as the rib portion 240 extends from the first end 234 to the second end 236. In some examples, the uniform width of the rib portion 240 may be about 150 nanometers, although other widths may be used. In alternative configurations, the rib portion 240 may have a width that varies between the first and second ends 234, 236. For example, the width of the rib portion 240 may taper similar to or in the same direction as the tapering of the base portion 238. Alternatively, the width of the rib portion 240 may taper in the opposite direction as the tapering of the base portion 238. Various configurations are possible.

At the second end 236 of the rotator 206, although the pair of optical signals may now both be polarized as TE mode signals and in a polarized mode supported by downstream processing circuitry (see processing circuitry 112 in FIG. 1), the processing circuitry may need to receive the $TE_0$ and the $TE_1$ mode signals separately or individually in order to successfully process them. The nanotaper 202 and the rotator 206 may be or makeup a single waveguide or waveguide path over which the pair of optical signals propagate together. As such, the optical waveguide structure 200 may further include a separator 208 that is configured to separate the $TE_0$ mode optical signal and the $TE_1$ mode signal into separate optical waveguides or waveguide paths before being supplied to the processing circuitry.

In the example embodiment shown in FIG. 2, the separator 208 may include a splitter portion, such as Y-splitter 242, and a coupler portion, such as two-by-two (2×2) or three decibel (3 dB) coupler 244. The Y-splitter 242 may receive the $TE_0$ mode optical signal and the $TE_1$ mode optical signal together from the rotator 206 and split the $TE_0$ mode optical signal and the $TE_1$ mode optical signal into two waveguide paths. The split may not separate or isolate the $TE_0$ and $TE_1$ mode optical signals from each other. Instead, the energies of the $TE_0$ and $TE_1$ mode optical signals may each be split into first and second (remaining) energy portions. In some examples, the proportions of the first and second energy portions may be about half in each of the two waveguide paths, although other proportions of the first and second energy portions may be determined. That is, about half of the energy of the $TE_0$ mode optical signal and about half of the energy of the $TE_1$ mode optical signal may be coupled to one waveguide path, and about half of the energy of the $TE_0$ mode optical signal about half of the energy of the $TE_1$ mode optical signal may be coupled to the other waveguide path. The 2×2 coupler 244 may then split or isolate the $TE_0$ and $TE_1$ mode optical signals from each other by confining all or substantially all of the energy of the $TE_0$ mode optical signal into one waveguide path and all or substantially all of the energy of the $TE_1$ mode optical signal into the other waveguide path.

Similar to the nanotaper 202 and the rotator 204, the splitter 242 and the coupler 244 may be designed to be adiabatic optical waveguide structures. In particular, both the splitter 242 and the coupler 244 may have sufficient lengths so that the splitting and coupling of the pair of optical signals is performed with minimal energy loss and high isolation as the optical signals propagate through the splitter 242 and the coupler 244. In some example embodiments, each of the Y-splitter 242 and the 2×2 coupler 244 may have a length in a range of about 40 to 50 microns, although other lengths may be used.

As shown in FIG. 2, the Y-splitter 242 may include a three-pronged waveguide structure that is symmetric relative to the direction of propagation. The symmetric Y-splitter 242 may include three tapering portions 246, 248, 250 to receive and split the $TE_0$ and $TE_1$ mode optical signals into two optical waveguide paths. A first tapering portion 246 may have a first end 252 that abuts or is connected to the second end 236 of the rotator 206 to receive the $TE_0$ and $TM_1$ mode optical signals. The first tapering portion 246 may have a width at the first end 252 that is the same or substantially the same as the width of the rotator 206 at the second end 236 and that tapers to a small width or point at a second end 254. As $TE_0$ and $TE_1$ mode optical signals propagate along the first tapering portion 246, the $TE_0$ and $TE_1$ mode optical signals may be less confined to the first tapering portion 246 and move or be contained in the evanescent field outside or around the first tapering portion 246.

The second and third tapering portions 248, 250 may each be adapted to couple the $TE_0$ and $TE_1$ mode optical signals as the signals become less confined to the first tapering portion 246, forming the beginning of the separate waveguide paths. Each of the second and third tapering portions 248, 250 may couple about half of the energy in the $TE_0$ and $TE_1$ mode optical signals. As shown in FIG. 2, the second and third tapering portions 248, 250 may be inverse tapers that taper inversely relative to the first tapering portion 246. Each of the second and third tapering portions 248, 250 may extend from first ends 256, 258 located at or near the first end 252 of the first tapering portion 246 to second ends 260, 262 located at or near the second end 254 of the first tapering portion 246. The second and third tapering portions 248, 250 may increase in width from the first ends 256, 258, where they may have relatively small widths or converge to points, to larger widths at the second ends 260, 262 to couple the $TE_0$ and $TE_1$ mode optical signals.

The first tapering portion 246 may include opposing sides 264 and 266 that extend from the first end 252 to the second end 254. The second tapering portion 248 may include a side 268 that may face and extend substantially parallel with the side 264 of the first tapering portion 246. Similarly, the third tapering portion 250 may include a side 270 that may face and extend substantially parallel with the opposing side 266 of the first tapering portion 246. The sides 264 and 268 of the first and second portions 246, 248 may determine a spacing or separation between the first and second portions 246, 248. Similarly, the sides 266, 270 may determine a spacing or separation between the first and third portions 246, 250. The spacing between first and second portions 246, 248 and between the first and third portions 246, 250 may be sufficient for the second and third tapering portions 248, 250 to couple the $TE_0$ and $TE_1$ mode optical signals.

The 2×2 (or 3 dB) coupler 244 may include first and second parallel waveguide paths 272, 274 extending from a first end 276 of the 2×2 coupler 244 to a second end 280 of the 2×2 coupler 244. The 2×2 coupler 244 may be configured to be symmetric along the axis of propagation at one of the first end 276 or the second end 280 and asymmetric along the axis of propagation at the other of the first end 276 or the second end 280. The 2×2 coupler 244 may be symmetric at either the first or second ends 276, 280 where the widths of the waveguide paths 272, 274 are the same, and may be asymmetric where the widths of the waveguide paths 272, 274 are different. At the asymmetric end, the waveguide path 272 or 274 having the larger width may couple the $TE_0$ mode signal, and the waveguide path 272 or 274 having the smaller width may couple the $TE_1$ mode signal.

In the example configuration for the 2×2 coupler 244 shown in FIG. 2, the 2×2 coupler 244 is symmetric at the first end 276 in that the widths of the waveguide paths 272, 274 at the first end 276 are the same, and is asymmetric at the second end 280 in that the widths of the waveguide paths 272, 274 at the second end 280 are different. To achieve asymmetry at the second end 280, the second waveguide path 274 has a substantially constant width while the first waveguide path 272 inversely tapers between the first and second ends 276, 280. Because the first waveguide path 272 inversely tapers and thus has the larger width at the second end 280, the first waveguide path 272 may couple substantially all of the energy of the $TE_0$ mode signal, and the second waveguide path 274 may couple substantially all of the energy of the $TE_1$ mode signal.

One of the waveguide paths may taper (or inversely taper) from the first ends 276, 278 to the second ends 280, 282, while the other waveguide path may have a substantially constant width. In the example configuration shown in FIG. 2, the first waveguide path 272 may increase in width from the first end 276 to the second end 280, and the second waveguide path 274 may have a substantially constant width from the first end 278 to the second end 282. The widths of the tapering and constant-width waveguide paths 272, 274 may be determined so that all or substantially all of the energy of the $TE_0$ mode optical signal is coupled to the first, tapering waveguide path 272, and all or substantially all of the energy of the $TE_1$ mode optical signal is coupled to the second, constant-width waveguide path 274.

The widths of the first and second waveguide paths 272, 274 at the first end 276 may be equal or substantially equal to the widths of the second and third tapering portions 248, 250 at their second ends 260, 262. That is, the widths at the output of the splitter 242 may be the same as the widths at the input of the coupler 244. In the example embodiment shown in FIG. 2, the width at these ends may be chosen to be the width of the constant-width waveguide path 274 that couples the $TE_1$ mode optical signal, and the width of the first, tapering waveguide path 272 may be chosen to increase to couple the $TE_0$ mode optical signal. In an alternative example configuration, the widths for the output of the splitter 242 and the input of the coupler 244 may be chosen to be the width of the waveguide path 272 that couples the $TE_0$ mode signal, in which case the first waveguide path 272 may have a constant width, and the second waveguide path 274 that couples the $TE_1$ mode signal may inversely taper to a smaller width.

In alternative example configurations of the 2×2 coupler 244, instead of one width remaining constant between the ends 276, 280, both of the waveguide paths 272, 274 may taper, as long as the widths at the second end 280 are different to achieve asymmetry. In still other alternative example configurations, the 2×2 coupler 244 may be asymmetric at the first end 276 and symmetric at the second end 280.

The first and second parallel waveguide paths 272, 274 may be spaced apart by an appropriate width or spacing 284 so that desired coupling of the $TE_0$ and the $TE_1$ mode optical signals to their respective waveguide paths 272, 274 may be achieved. In some example configurations, as shown in FIG. 2, the parallel waveguide paths 272, 274 to be positioned closer to each other than the second and third tapering portions 248, 250 of the Y-splitter 242 at their respective ends 260, 262 due to the spacing 284. To position the parallel waveguide paths 272, 274 closer, the separator 208 may include a first coupling portion 286 having a pair of waveguide paths 286a, 286b to couple the second ends 260, 262 of the Y-splitter 242 with the first ends 276, 278 of the 2×2 coupler 244. The waveguide paths 286a, 286b may be S-shaped bends (or S-bends) as shown in FIG. 2. Alternatively, the waveguide paths 286a, 286b may be differently shaped waveguide paths, such as straight-shaped waveguide paths or curved paths other than S-shaped. In addition, depending on the configuration of the processing circuitry, the parallel waveguide paths 272, 274 may need to be spaced wider apart from each other than their spacing at the ends 280, 282. As such, a second coupling portion 288, which may include S-bends 288a, 288b, may be included to widen the spacing between the first and second waveguide paths 272, 274 before the $TE_0$ mode and the $TE_1$ mode signals are sent to the processing circuitry. The first and second coupling portions 286, 288 shown in FIG. 2 are not limited to S-bend configurations and other shaped-paths may be used couple the splitter 242 and 244 and/or to widen the waveguide paths at the output of the coupler 244. In addition or alternatively, one or both of the first and second coupling portions 286, 288 may be omitted from the separator 208 as required. Various configurations are possible.

In an alternative configuration of the coupler 244, a directional coupler, which may a symmetric coupler (as opposed to the 2×2 coupler, which may be an asymmetric coupler), may be used instead of a 2×2 coupler. Where a directional coupler is used, both of the waveguide paths may have constant widths from the first ends 276, 276 to the second ends 280, 282. However, the directional coupler may be a less desirable coupler than the 2×2 coupler due to its increased sensitivity to thickness, fabrication variations, length, and wavelength. Alternatively, the directional coupler may be shorter in length compared to the 2×2 coupler, and so may be more desirable in terms of size.

As described above, the separator 208 may separate the $TE_0$ and $TE_1$ mode optical signals that may be propagating together along a single optical waveguide or waveguide path into separate and isolated optical waveguide paths. In the example configuration shown in FIG. 2, the nanotaper 202, the rotator 204 and the first tapering portion 246 of the splitter 242 may make up the single optical waveguide or waveguide path; and the second and third tapering portions 248, 250, the first coupling portion 286, the coupler 244, and the second coupling portion 288 may make up the separate, isolated optical waveguide paths.

Figure 3:
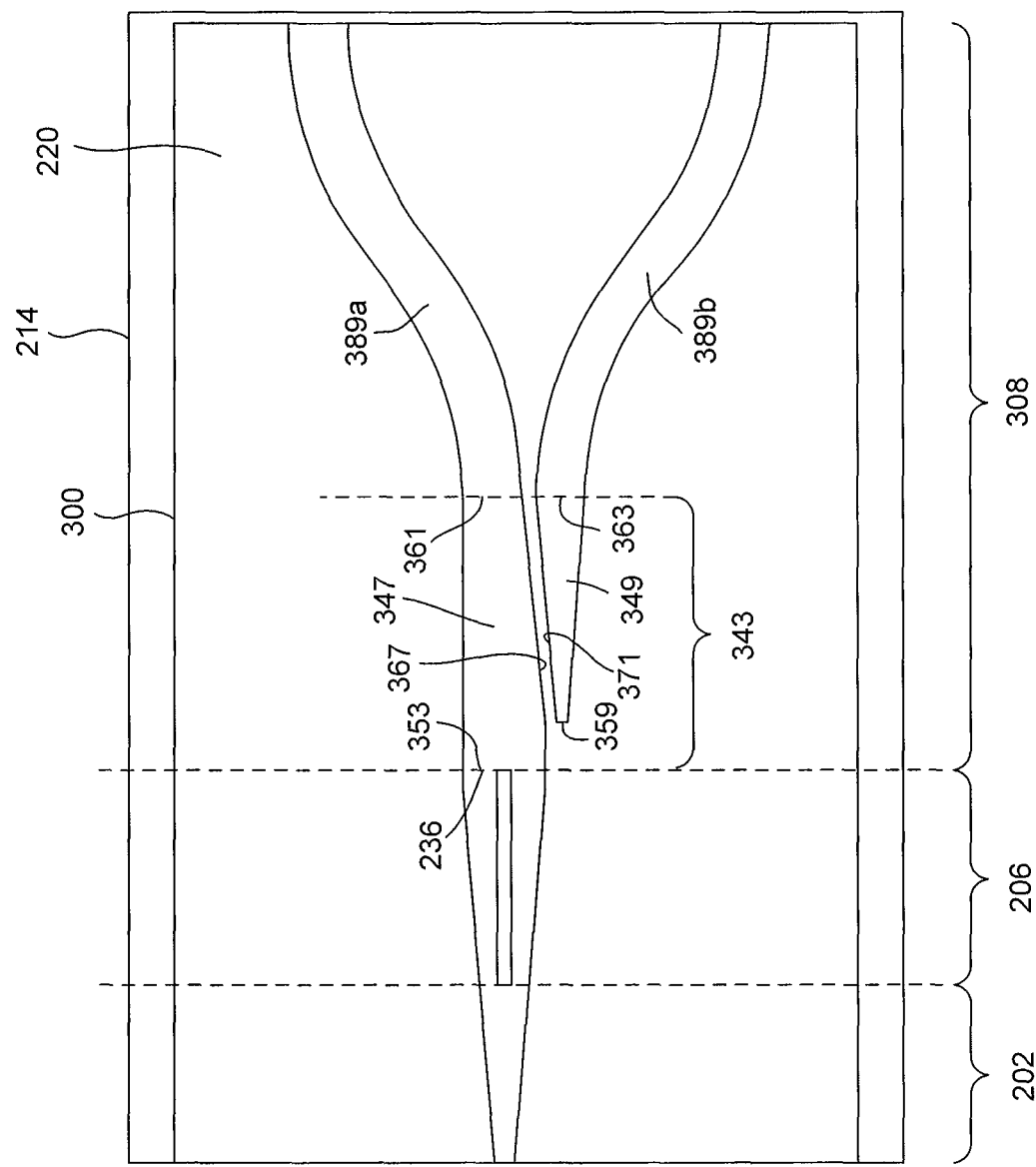
FIG. 3 illustrates a top view of another example optical waveguide structure.

FIG. 3 shows a top view of an alternative example optical waveguide structure 300. The alternative example optical waveguide structure 300 may be similar to the example waveguide structure 200, except that the waveguide structure 300 may include a different separator 308. The alternative separator 308 may include an asymmetric Y-splitter 343 that is asymmetric relative to the direction of propagation. The asymmetric Y-splitter 343 may replace the symmetric Y-splitter 242, the coupler 244, and the S-bend coupling portion 286 shown in FIG. 2. Instead, the asymmetric Y-splitter 343 may combine the splitter and the coupler into a single optical waveguide structure that performs the splitting and the coupling functions simultaneously or together, rather than in separate stages. Otherwise stated, the asymmetric Y-splitter 343 may include a dual waveguide structure in which a first waveguide receives the $TE_0$ and $TE_1$ mode optical signals and a second waveguide couples away either the $TE_0$ mode optical signal or the $TE_1$ mode optical signal from the first waveguide so that the $TE_0$ and $TE_1$ mode optical signals are in separate optical waveguide paths. By combining the splitting and coupling stages of the separator, the example separator 308 of FIG. 3 may be shorter in length than the example separator 208 of FIG. 3, and thus may be a more preferable design choice.

As shown in FIG. 3, the asymmetric Y-splitter 343 may include a first tapering portion 347 and a second tapering portion 349. The first tapering portion 347 may have a first end 353 that abuts or connects to the output or second end 236 of the rotator 206. The first tapering portion 347 may taper down from a width at the first end 353 to a width at a second end 361. The second tapering portion 349 may inversely taper or increase in width from a first end 359 having a small width or converging at a point to a second end 363 having a width that may be different than the width of the first tapering portion 347 at the second end 361.

The widths of the first and second tapering portions 347, 349 may be configured so that the second tapering portion 349 couples either the $TE_0$ mode optical signal or the $TE_1$ mode optical signal away from the first tapering portion 347 while the other optical signal remains coupled to the first tapering portion 347. In this way, the $TE_0$ and $TE_1$ mode optical signals are in separate optical waveguide paths at the ends 361, 363 to achieve modal diversity. Where the width of the first tapering portion 347 at the end 361 is larger than the width of the second tapering portion 349 at the end 363, as shown in FIG. 3, the $TE_0$ mode optical signal may remain coupled to the first waveguide portion 347 and the $TE_1$ mode optical signal may be coupled to the second waveguide portion 349. In an alternative configuration, the width of the first tapering portion 237 at the end 361 may be smaller than the width of the second tapering portion 349 at the end 363 such that the $TE_1$ mode optical signal remains coupled to the first tapering portion 347 and the $TE_0$ mode optical signal is coupled to the second tapering portion 349.

In alternative optical waveguide applications, the asymmetric Y-splitter 343 may be configured for splitting and/or for applications that do not use modal diversity, as opposed to separation where modal diversity is achieved. That is, instead of all or substantially all of the energy of the $TE_0$ mode optical signal being coupled to the first tapering portion 347 and all or substantially all of the energy of the $TE_1$ mode signal being coupled to the second tapering portion 349 for modal diversity, the asymmetric Y-splitter 343 may be configured so that first energy portions of both the $TE_0$ mode optical signal and the $TE_1$ mode optical signal are coupled to the first tapering portion 347 and second energy portions of both the $TE_0$ mode optical signal and the $TE_1$ mode optical signal are coupled to the second tapering portion 349.

For some example configurations, the asymmetric Y-splitter 343 may split the first and second energy portions equally so that about 50% of the energies of the $TE_0$ mode optical signal and the $TE_1$ mode optical signal are coupled to the first tapering portion 347, and about 50% of the energies of the $TE_0$ mode optical signal and the $TE_1$ mode optical signal are coupled to the second tapering portion 349. For these example configurations, the widths of the first and second tapering portions 347, 349 at their respective ends 361, 363 may be the same or substantially the same. Alternatively, the first and second energy portions may vary, such as to achieve desired or predetermined ratios of energy portions in the first and second tapering portions. As an example, widths may be configured so that 86% of the energy is in the first tapering portion 347 and 14% of the energy is in the second tapering portion 349. Various configurations are possible.

In still other optical waveguide applications, the asymmetric Y-splitter 343 may be used independent of and/or without the rotator 206. In addition or alternatively, the asymmetric Y-splitter 343 may be used for splitting or combining for optical waveguide applications where only a single order TE mode optical signal is propagated through the optical waveguide. For example, the asymmetric Y-splitter 343 may configured to split a single $TE_0$ mode optical signal into different optical waveguide paths or combine a pair of $TE_0$ mode optical signal into a single optical waveguide path.

As shown in FIG. 3 the second tapering portion 349 may include a side 371 that faces and extends substantially parallel with a side 367 of the first tapering portion 347. The sides 367 and 371 may be spaced apart from each other by an appropriate distance or spacing so that coupling away of the $TE_1$ mode signal to the second tapering portion 349 may be achieved. In addition, as shown in FIG. 3, a coupling portion 389, which may include S-bends, other curved structure or straight structures, may be coupled to the ends 361, 363 to widen the separate optical waveguide paths before the $TE_0$ and $TE_1$ mode optical signals may be sent to the processing circuitry.

In addition, the asymmetric Y-splitter 343 may be an adiabatic optical waveguide structure, like the components of the optical waveguide structure 200. That is, the asymmetric Y-splitter 343 may have a sufficient length from the first ends 353, 359 to the second ends 361, 363 so that the splitting and coupling of the pair of optical signals is performed with minimal energy loss and high isolation as the optical signals propagate through the asymmetric Y-splitter 343. In some example embodiments, the asymmetric Y-splitter 343 may have a length of about 50 microns, although other lengths may be used.

Figure 4:
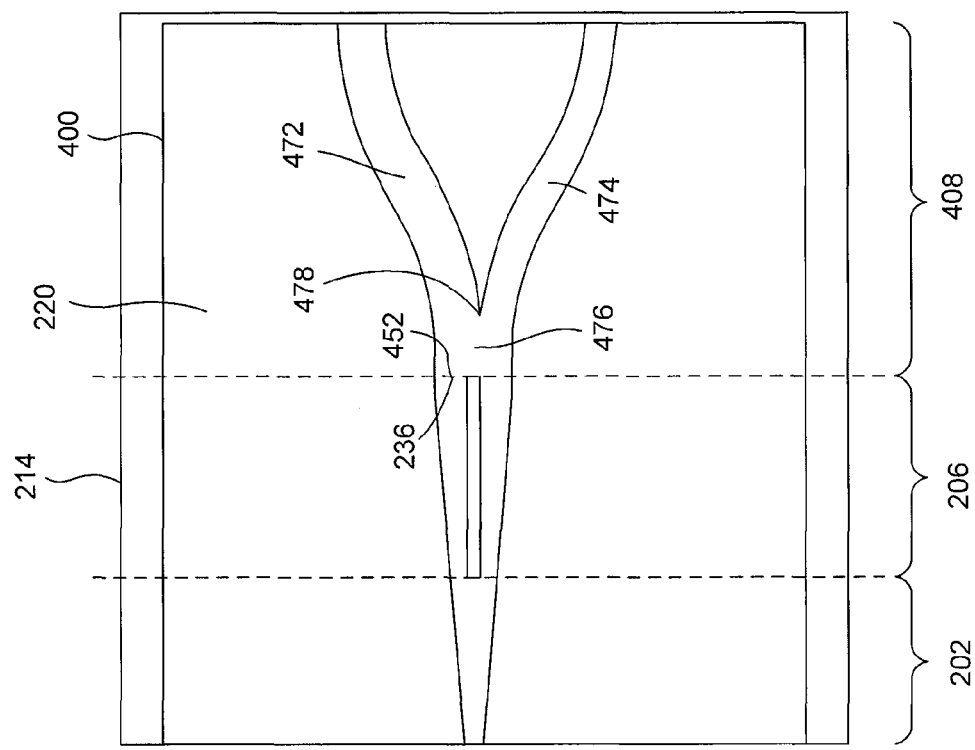
FIG. 4 illustrates a top view of a third example optical waveguide structure.

FIG. 4 shows a top view of another alternative example optical waveguide structure 400. The alternative example optical waveguide structure 400 may be similar to the example waveguide structures 200 or 300, except that the waveguide structure 400 may include a different separator 408. The separator 408 may be configured to receive the $TE_0$ and $TE_1$ mode signals at an end 452 that abuts the second end 236 of the rotator 206 and split the $TE_0$ and $TE_1$ mode signals into separate optical waveguide paths 472, 474.

The separator 408 may include a single waveguide path 476 connected to the second end 236 of the rotator 206. The width of the single waveguide path 476 may be equal or substantially equal to the width of the rotator 206 at the second end 236. The single waveguide path 476 may split into the pair of waveguide paths 472, 474 at a point or position 478. A total or combined width of the first and second waveguide paths 472, 474 may be equal or substantially equal to the width of the rotator 206 at the end 236 and/or the width of the single waveguide path 476. In addition, the individual widths of the first and second waveguide paths 472, 474 may be different from each other so that the $TE_0$ and $TE_1$ mode optical signals are coupled to different waveguide paths 472, 474. As shown in FIG. 4, the first waveguide path 472 has the larger width and may couple the $TE_0$ mode signal and the second waveguide path 474 may have the smaller width and couple the $TE_1$ mode signal.

The length of the single waveguide path 476 may vary, and in some example configurations may not be included. For example, the point or position 478 of the split may be positioned at the end 452 abutting the rotator 206, and the $TE_0$ and $TE_1$ mode signals may split into the separate waveguide paths 472, 474 immediately following the rotator 206.

The waveguide paths 472, 474 shown in FIG. 4 are configured as S-bends. However, in alternative example configurations, the waveguide paths 472, 474 may be straight paths or curved paths other than S-shaped paths. Various configurations are possible.

The separator 408 may generally provide a simpler design and structure compared to the separators 208, 308 shown in FIGS. 2 and 3. However, the separator 408 may be lossier and/or yield a greater amount of scattering compared to the separators 208, 308 due to the separator 408 being configured to split the $TE_0$ and $TE_1$ mode optical signals in a more sudden or less gradual (or less adiabatic) manner.

The optical waveguide structures 200, 300, 400 are described as operating in a receive mode, where a pair of orthogonally polarized optical signals are received and/or coupled from an external source, converted to a first optical signal polarized in the $TE_0$ mode and a second optical signal polarized in the $TE_1$ mode, and separated from each other into separate waveguide paths for processing by downstream optical processing circuitry.

In addition or alternatively, as described above with reference to FIG. 1, the optical waveguide structures 200, 300, 400 may operate in a transmit mode. For example, the optical waveguide structures 200, 300, 400 may receive a pair of TE mode optical signals from processing circuitry and confine them to a single waveguide path, such with the rotators 208, 308, 408; rotate one of the TE mode optical signals to being polarized in the TM mode while maintaining the other optical signal in the TE mode, such as with the rotator 206, and provide them to a front end or edge of the optical waveguide 200, 300, 400 for coupling to an external source. In this way, the optical waveguide structures may function or operate as a front-end component of a receiver, a transmitter, or a transceiver.

Some example applications where the optical waveguide structures operate in transmit mode may include various modulation schemes, including dual-polarization schemes, where modulated optical signals may be provided from processing circuitry for transmission. Example modulation schemes may include quadrature phase-shift keying (QPSK), quadrature amplitude modulation (QAM), pulse amplitude modulation (PAM), or binary phase-shift keying (BPSK), as examples. Other modulation schemes may be possible. The optical waveguide structures 200, 300, 400 may be configured to receive the modulated optical signals in the TE mode from the processing circuitry, and convert one of the TE mode signals to a TM mode signal for transmission and/or coupling to an external source. Various other applications are possible.

The example optical waveguide structures 200, 300, 400 may be generally planar structures having planar surfaces. In particular, the stages or parts of the optical waveguide structures 200, 300, 400, including the nanotaper 202, the rotator 206, and the separator 208, 308, 408, may be formed as a plurality of planar layers disposed on a planar surface of a substrate or buffer, such as the substrate or buffer 220. Further, all of the parts, except the rib portion 240 of the rotator 206, may be integrated or fabricated as a single layer having a substantially uniform thickness and made of the same material. The rib portion 240 may be included in the optical waveguide structures 200, 300, 400 as a second, additional layer that is disposed on and/or that projects from the first layer. The rib portion 240 may be made of the same material or a different material as the parts of the waveguides structures 200, 300, 400 making up the first layer. The first layer or the combined first and second layers may be referred to as the core or core component of the waveguide structure. To illustrate, the nanotaper 202 identified in FIG. 2 may additionally or alternatively be referred to as the core of the nanotaper 202. Similarly, the base portion 238 and the rib portion 240 of the rotator 206 may collectively be referred to as the core of the rotator 206.

As described above, the optical waveguide structures 200, 300, 400, including each of the nanotaper 202, the rotator 206, and the separators 208, 308, 408, may be adiabatic optical waveguide structures, where loss and interference between optical signals may be minimized. In addition, the waveguide structures 200, 300, 400 may be considered broadband structures that may operate or perform adiabatically, with optimal performance, or without performance degradation over a broad range of wavelengths. Here, broadband may refer to an operation band of about 100 nanometers.

Figure 5:
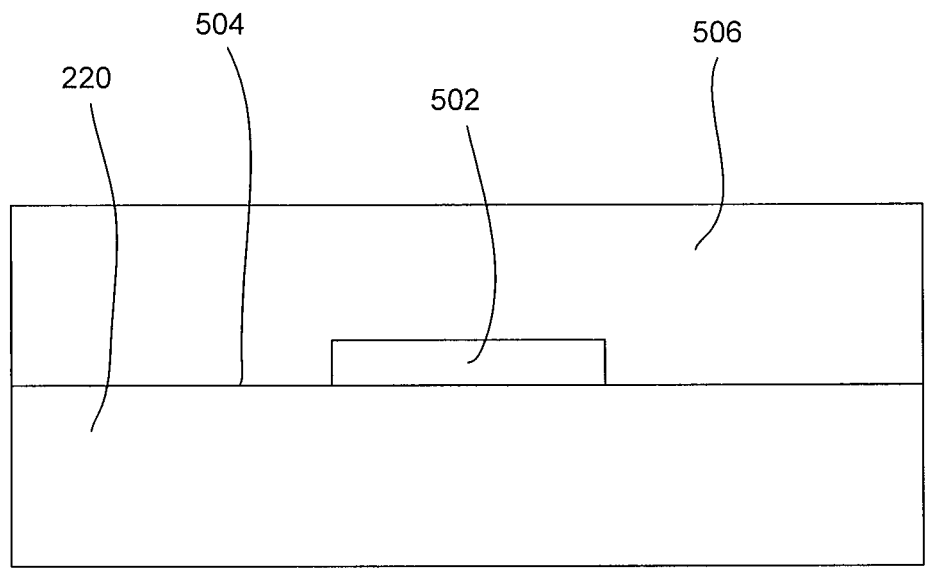
FIG. 5 illustrates a cross-sectional side view a single-layer core portion of an example optical waveguide structure.

FIG. 5 shows a cross-sectional side view of the nanotaper 202 taken along line 5-5 in FIG. 1. The nanotaper 202 may include a core 502 disposed on a planar surface 504 of the substrate or buffer 220. The core 502 may be encased or surrounded by a cladding 506. As shown in FIG. 5, the core 502 may have an associated thickness, which may be in a range of 110 to 130 nanometers, although other thicknesses may be used. In addition, the core 502, the cladding 506, and the substrate 220 may be made of any materials, including dielectric materials, that may be used for dielectric or optical waveguides or optical integrated circuits using dielectric or optical waveguides. In some example configurations, the substrate 220 may be made of silicon dioxide ($SiO_2$) or other material having a relatively low index of refraction. Similar to the substrate 220, the cladding 506 may also be made of a material having a relatively low index of refraction. For example, the cladding 506 may be made of glass, which has an index of refraction of about 1.5. In contrast, the core 502 may be made of a material that has a relatively high index of refraction, such as silicon (Si), which has an index of refraction of about 3.5. Various materials other than silicon may be used such as gallium nitride, silicon-based materials, such as silicon nitride, silicon oxy-nitride, single crystal silicon, polycrystalline silicon materials, or other III/V materials such as gallium arsenide, indium phosphide, or other related compounds, as non-limiting examples. Various other materials may be used. The contrast or difference in indices of refraction between the core 502 and the cladding 506 may render the optical waveguide structure as a high contrast optical waveguide, meaning that a relatively large difference exists between the indices of refraction of the core 502 material and cladding 506 material.

Although the cross-sectional view shown in FIG. 5 is of the nanotaper 202, the cross-sectional view may be representative of other parts or portions of the example optical waveguide structures 200, 300, or 400 having a single layer core, such as the separators 208 or 308. The thickness of the core 502 and/or the materials used for the core 502 and/or the cladding 506 for other single-layer cross sections may be the same throughout the waveguide structures 200, 300. Differences for other cross sections may include the widths of the cores and/or that other cross-sections may include two separate cores for the two separate waveguide paths, as illustrated by the top views of FIGS. 2 and 3.

Figure 6:
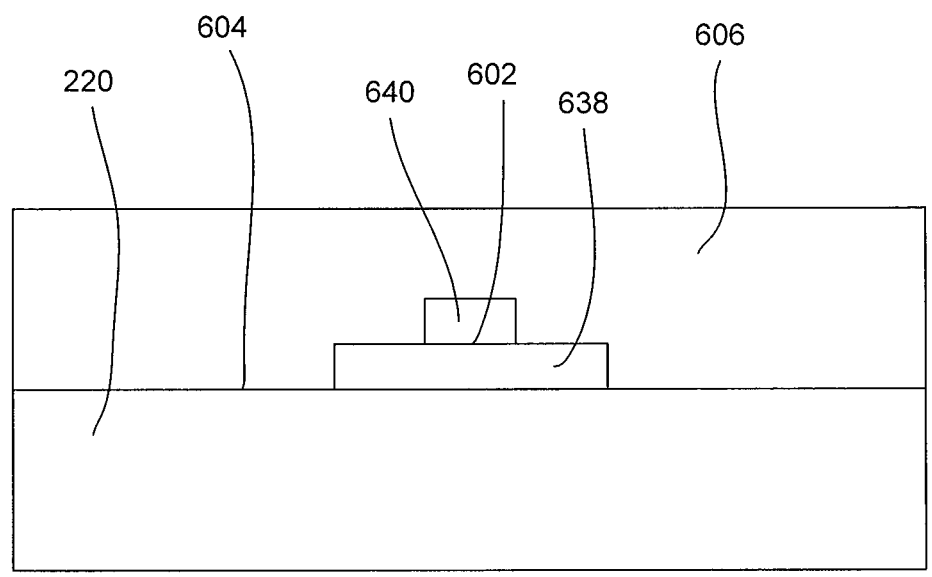
FIG. 6 illustrates a cross-sectional side view of a dual-layer core portion of an example waveguide structure.

FIG. 6 shows a cross-sectional side view of the rotator 206 taken along line 6-6. The rotator 206 may include a core 602 that is disposed on a planar surface of the substrate 220. The core 602 may include a first layer 638, which may be the layer for the base portion 238 shown in FIG. 2. The first layer 638 may be the same layer and/or a layer that is coplanar with the core 502 for the other parts of the waveguide structures 200, 300 made of a single layer. For example, the first layer 638 may be fabricated to be made of the same material and/or be of the same or substantially the same thickness as the core 502 for the single-layer core components. The core 602 may further include a second layer 640, which may be the layer for the rib portion 240 shown in FIG. 2. As shown in FIG. 6, the second layer 640 may be disposed on and/or extend from the first layer 638. The second layer 640 may be made of the same material or a different material as the material making up the first layer 638. In one example configuration, the first layer 638 may be made of single crystal silicon and the second layer making up the rib portion 640 may be made of polycrystalline silicon (poly-silicon), although other materials may be used.

The combination of the base portion 238 and the rib portion 240 for the rotator 206 may form a geometry, both in terms of its cross section as well as its shape as it extends in the direction of propagation, that, in accordance with Maxwell's laws, may cause the $TE_0$ mode optical signal to maintain its polarization in the $TE_0$ state, while causing the $TM_0$ mode optical signal to change its polarization to the $TE_1$ mode, as the optical signals propagate through the rotator 206. In particular, the combination of the base portion 238 and the rib portion 240 may create certain types of symmetries, asymmetries, and tapers to yield the maintenance and conversion of the $TE_0$ and $TM_0$ signals.

In one example configuration of the rotator 206, as shown from the top view of FIG. 2, the rotator 206 may be symmetrical or have mirror symmetry along the axis extending in the direction of propagation. The rib portion 240 may be placed along the axis of propagation or in the center of the base portion 238 (as shown in both FIGS. 2 and 6) to achieve mirror symmetry in the direction of propagation. In an alternative configuration, the rotator 206 may be asymmetrical or may not have mirror symmetry in the direction of propagation. In particular, the rib portion 240 may be off-centered from the axis of propagation or the center of the base portion 238. In addition or alternatively, the rib portion 240 may have a varying width and/or taper between the ends 234, 236 to form the asymmetry.

For configurations where the rotator 206 has mirror symmetry in the direction of propagation, the pair of optical signals may be coupled by the nanotaper 202 as pure TE and TM mode signals, meaning that the TE mode signal does not have a TM component or any TM qualities and the TM mode signal does not have a TE component or any TE qualities. Alternatively, where the rotator 206 is asymmetrical in the direction of propagation, the pair of optical signals coupled by the nanotaper 202 may not be pure TE and TM mode signals. However, the pair of optical signals may still be orthogonally polarized to each other and highly linearly polarized, particularly where the nanotaper 202 has a sufficient length.

In addition, as shown in FIG. 6, the rotator 206 may be asymmetrical or have broken symmetry between the first layer 638 and the second layer 640. The broken symmetry may be achieved by configuring the rib portion 240 to have a smaller width than any of the widths of the base portion 238, as described above with reference to FIG. 2. Further, the rotator 206, or particularly the base portion 238 of the rotator 206, may be configured to have a relatively smooth taper so that the rotator 206 is an adiabatic structure.

The optical waveguide structures 200, 300, 400 as described above are not limited to including all of the nanotaper 202, the rotator 206, and the separator 208, 308. Alternative example embodiments of the optical waveguide structures 200, 300 may include less than all of the nanotaper 202, the rotator 206, and the separators 208, 308, 408. For example, alternative embodiments of the optical waveguide structures 200, 300 may include only the rotator 206 or only the separator 208, 308, 408. Other alternative embodiments may include the rotator 206 and the rotator 208, 308, or 408, and may receive a pair of TE mode and TM mode optical signals from a coupling structure, such as the nanotaper 202 or some other coupling structure such as a grating coupler, that is separate or external to the optical waveguide structures 200, 300. Still other alternative example embodiments of the optical waveguide structures 200, 300 may include the nanotaper 202 and the rotator 206, without the separator 208, 308, or 408. Further alternative example embodiments of the optical waveguide structure 200 may include only a portion of the separator 208, such as the Y-splitter 242 but not the 2×2 coupler 244. Various configurations or combinations of configurations for the optical waveguide structures 200, 300, 400 are possible.

Figure 7:
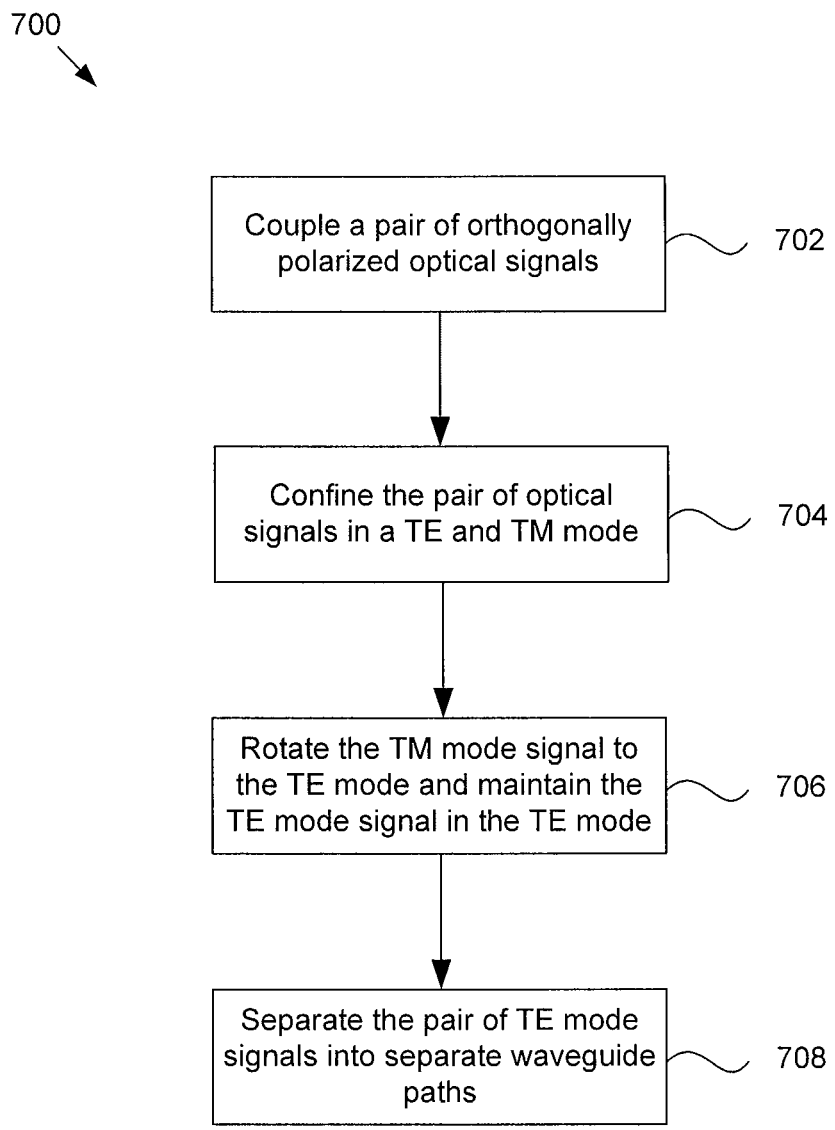
FIG. 7 illustrates a flow diagram of an example method of converting a pair of orthogonally polarized optical signals to a pair of TE mode optical signals.

FIG. 7 describes a method of converting a pair of orthogonally polarized optical signals coupled from an external source to a pair of TE mode optical signals. At block 702, the pair of orthogonally polarized optical signals may be coupled from an external source, such as with a nanotaper of an optical waveguide. The nanotaper may have a width at an edge of the optical waveguide that is configured for coupling to the external source. At block 704, the nanotaper may confine the pair of orthogonally polarized optical signals to the waveguide structure as a first optical signal polarized in the TE mode and the second optical signal polarized in the TM mode. The TE and TM modes may be first-order TE and TM modes.

At block 706, the first and second optical signals may propagate through a rotator of the optical waveguide structure, where the first optical signal in the TE mode may be maintained in the TE mode, and the second optical signal may be rotated from being polarized in the TM mode to being polarized in a TE mode. The second optical signal may be polarized in a TE mode having an order that is higher than the first order. For example, the rotator may polarize the second optical signal in the second-order $TE_1$ mode.

At block 708, the first and second optical signals may be separated from each other into separate optical waveguide paths. The first and second optical signals may first be split using a Y-splitter, where about half of the energy of the first and second optical signals is coupled to a first waveguide path, and about half of the energy of the first and second optical signals is coupled to a second waveguide path. After being split by the Y-splitter, the first and second optical signals may be separated from each other into separate waveguide paths with an optical coupler, such as a two-by-two coupler that includes a pair of waveguide paths or portions. A first waveguide portion of the pair may couple substantially all of the energy of the first optical signal, and a second waveguide portion of the pair may couple substantially all of the energy of the second optical signal so that the first and second optical signals are in separate waveguide paths.

Alternatively, the separator may receive and split the first and second optical signals from each other using an asymmetric Y-splitter. In particular, a first tapering portion may receive the first and second optical signals. One of the optical signals may become less confined to the first tapering portion as the first and second optical signals propagate through the first tapering portion. At the same time, a second tapering portion of the asymmetric Y-splitter may couple the less-confined optical signal so that the two optical signals are separated from each other in separate waveguide paths.

Figure 8:
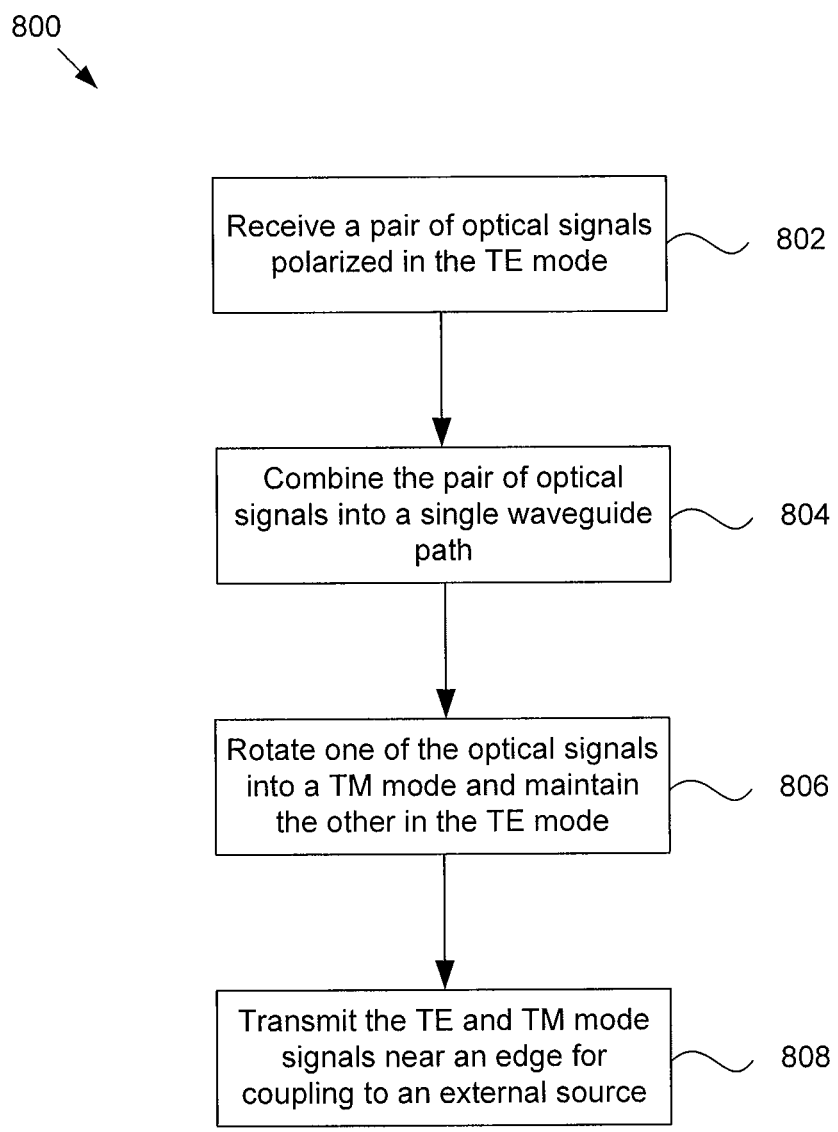
FIG. 8 illustrates a flow diagram of an example method of converting a pair of TE mode optical signals to a pair of orthogonally polarized optical signals.

FIG. 8 shows a flow chart of an example method 800 of receiving a pair of TE mode optical signals and converting them to a pair of orthogonally polarized optical signals for transmission and/or coupling to an external source. At block 802, a separator (which may also or alternatively be referred to as a combiner) may receive a pair of optical signals both polarized in the TE mode from separate and/or isolated waveguide paths. The pair of optical signals may be transmitted from processing circuitry. One of the TE mode signals may be in the first-order TE mode, and the other of the TE mode signals may in a TE mode having an order that is greater than the first order, such as the second order.

At block 804, the combiner may combine and/or confine the pair of TE mode optical signals to a single waveguide path. In one example, a two-by-two coupler may couple the pair of TE mode signals into a couple of parallel waveguide portions such that about half of the energy for each of the TE mode signals is coupled to a first waveguide portion and about half of the energy for each of the TE mode signals is coupled to a second waveguide portion. A Y-splitter may then couple the TE mode signals from the pair of waveguide portions so that all or substantially all of the energy from both the first and second optical signals is confined to a single waveguide path.

At block 806, a rotator may rotate one of the TE mode optical signals to being polarized in the TM mode, while maintaining the polarization of the other TE mode optical signal to the TE mode. For example, the $TE_0$ mode optical signal may be maintained in the $TE_0$ mode, while the $TE_1$ mode signal may be rotated to being polarized in the $TM_0$ mode.

At block 808, a nanotaper may receive the pair of optical signals confined to the waveguide structure in the TE and TM modes and transmit them to an end or edge of the waveguide structure, where they may be less confined in guided modes to the waveguide structure, and where they may be transmitted off chip and away from the waveguide structure.

Various embodiments described herein can be used alone or in combination with one another. The foregoing detailed description has described only a few of the many possible implementations of the present invention. For this reason, this detailed description is intended by way of illustration, and not by way of limitation.

We claim:

1. An apparatus comprising:
   an optical waveguide structure configured to transmit a pair of optical signals in guided modes, the optical waveguide structure comprising a rotator, wherein the rotator is configured to:
   receive a first optical signal of the pair of optical signals polarized in a transverse electric (TE) mode and maintain the first optical signal in the TE mode as the first optical signal propagates through the rotator; and
   receive a second optical signal of the pair of optical signals polarized in a transverse magnetic (TM) mode and convert the TM mode optical signal to a TE mode optical signal as the second optical signal propagates through the rotator,
   wherein the rotator comprises a dual-layer core comprising a first layer disposed on a substrate and a second layer disposed on the first layer,
   wherein the first layer comprises a base portion that inversely tapers from a first end to a second end of the core, wherein a width of the base portion at the first end is less than the width of the base portion at the second end, and
   wherein the second layer comprises a rib portion, the rib portion having a width that is less than the width of the base portion at the first end and at the second end.

2. The apparatus of claim 1, wherein the rotator is configured to: receive and maintain the first optical signal as a first-order TE mode signal, and receive the second optical signal as a first-order TM mode optical signal and convert the first-order TM mode optical signal to a TE mode optical signal having an order that is higher than the first order.

3. The apparatus of claim 2, wherein the rotator is configured to convert the first-order TM mode optical signal to a second-order TE mode optical signal.

4. The apparatus of claim 1, wherein the rib portion is centrally disposed on the base portion such that the rotator has mirror symmetry in a direction of propagation.

5. The apparatus of claim 1, wherein the rib portion is offset from a center of the base portion in a direction of propagation.

6. The apparatus of claim 1, wherein the rotator is an adiabatic structure.

7. The apparatus of claim 1, wherein the waveguide structure further comprises a separator that is configured to:
   receive the first optical signal and the second optical signal from the rotator; and
   separate the first optical signal from the second optical signal into separate first and second waveguide paths,
   wherein the separator comprises a single-layer core disposed on the substrate, wherein the single-layer core comprises:
   a Y-splitter comprising a first tapering portion configured to receive the first optical signal and the second optical signal from the rotator; and second and third tapering portions, the second tapering portion configured to couple first energy portions of each of the first and second optical signals from the first tapering portion, and the third tapering portion configured to couple second energy portions of each of the first and second optical signals from the first tapering portion; and
   a two-by-two coupler comprising a first waveguide portion configured in parallel with a second waveguide portion, each of the first waveguide portion and the second waveguide portion extending from a first end of the two-by-two coupler to a second end of the two-by-two coupler,
   wherein the two-by-two coupler is symmetric in a direction of propagation at one of the first end or the second end and is asymmetric in a direction of propagation at the other of the first end or the second end.

8. The apparatus of claim 7, wherein the first waveguide path comprises the second tapering portion of the Y-splitter and the first waveguide portion of the two-by-two coupler, wherein the second waveguide path comprises the third tapering portion of the Y-splitter and the second waveguide portion of the two-by-two coupler, wherein the first waveguide portion tapers in width between the first end and the second end of the two-by-two coupler and couples substantially all of the energy of the first optical signal, and wherein the second waveguide portion has a substantially uniform width from the first end to the second end of the two-by-two coupler and couples substantially all of the energy of the second optical signal.

9. The apparatus of claim 1, wherein the optical waveguide structure further comprises a separator that is configured to:
   receive the first optical signal and the second optical signal from the rotator; and
   separate the first optical signal from the second optical signal and into separate first and second waveguide paths,
   wherein the separator comprises a single-layer core disposed on the substrate, wherein the single-layer core comprises an asymmetric Y-splitter comprising:
   a first tapering portion that is configured to receive the first optical signal and the second optical signal from the rotator; and a second tapering portion that is configured to couple substantially all of the energy of one of the first optical signal or the signal optical signal away from the first tapering portion, while substantially all of the energy of the other of the first optical signal or the second optical signal remains coupled to the first tapering portion.

10. The apparatus of claim 1, further comprising a nanotaper, wherein the nanotaper comprises a single-layer core comprising a tapering portion extending from a first end to a second end, wherein a width of the nanotaper at the first end of the nanotaper is less than the width at the second end of the nanotaper, the width at the first end of the nanotaper configured to couple the first and second optical signals from an external source, and the width at the second end of the nanotaper configured to confine the first optical signal in the TE mode and the second optical signal in the TM mode.

11. A method comprising:
coupling, with a nanotaper of an optical waveguide structure, a first optical signal and a second optical signal from an external source, the first and second optical signals being coupled as a pair of orthogonally polarized optical signals;
confining to the optical waveguide structure, with the nanotaper, the first optical signal polarized in a transverse electric (TE) mode and the second optical signal polarized in a transverse magnetic (TM) mode;
rotating, with a rotator of the optical waveguide structure, the second optical signal from being polarized in the TM mode to being polarized in the TE mode as the second optical signal propagates through the rotator, while maintaining the polarization of the first optical signal polarized in the TE mode;
receiving, with a separator of the optical waveguide structure, the first optical signal polarized in the TE mode and the second optical signal polarized in the TE mode; and
separating, with the separator of the optical waveguide structure, the first optical signal from the second optical signal into separate first and second waveguide paths.

12. The method of claim 11, wherein confining to the optical waveguide structure the first optical signal in the TE mode and the second optical signal in the TM mode comprises: confining the first optical signal in a first-order TE mode and confining the second optical signal in a first-order TM mode.

13. The method of claim 11, wherein rotating the second optical signal from being polarized in the TM mode to being polarized in the TE mode comprises rotating the second optical signal from being polarized in a first-order TM mode to being polarized in a TE mode having an order higher than a first order.

14. The method of claim 13, wherein the TE mode having an order higher than the first order is a second-order TE mode.

15. The method of claim 11, wherein separating the first optical signal from the second optical signal comprises:
splitting, with a Y-splitter portion of the separator, a first energy portion of the first optical signal and a first energy portion of the second optical signal into a first tapering portion of the Y-splitter, and a second energy portion of the first optical signal and a second energy portion of the second optical signal into a second tapering portion of the Y-splitter; and
coupling, with a first waveguide portion of a two-by-two coupler of the separator, substantially all of the energy of the first optical signal; and coupling, with a second waveguide portion of the two-by-two coupler of the separator, substantially all of the energy of the second optical signal.

16. The method of claim 11, wherein separating the first optical signal and the second optical signal comprises:
receiving, with a first tapering portion of an asymmetric Y-splitter of the separator, the first optical signal and the second optical signal; and
coupling, with a second tapering portion of the asymmetric Y-splitter, one of the first optical signal or the second optical signal away from the first tapering portion while maintaining coupling of the other of the first optical signal or the second optical signal to the first tapering portion.

17. An apparatus comprising:
an optical integrated circuit comprising a front-end dielectric optical waveguide structure, the optical waveguide structure configured to at least one of:
receive a first pair of orthogonally polarized optical signals from an external source and provide the first pair of optical signals as a pair of transverse electric (TE) mode optical signals to processing circuitry; or
receive a second pair of optical signals as a pair of TE mode optical signals and convert the second pair of optical signals to a pair of orthogonally polarized signals for coupling external to the apparatus,
wherein the optical waveguide structure comprises a dual-layer dielectric core disposed on a substrate,
wherein a first layer of the dual-layer core comprises a base portion that increases in width from a first end to a second end, and wherein a second layer of the dual-layer core comprises a rib portion that extends over at least a portion of the base portion, the rib portion having a width that is less than the width of the base portion at the first end and at the second end.

18. The apparatus of claim 17, wherein the rib portion has a substantially uniform width from the first end to the second end, and is centrally disposed on the base portion in a direction of propagation.

19. The apparatus of claim 17, wherein the first layer of the dual-layer core further comprises at least two tapering portions configured to at least one of:
separate the first pair of optical signals as the pair of TE mode optical signals from each other into separate waveguide paths; or
confine the second pair of optical signals received from the separate waveguide paths into a single waveguide path, and transmit the confined second pair of signals to the dual-layer core comprising the base portion and the rib portion.

20. The apparatus of claim 19, wherein the at least two tapering portions comprises at least two first tapering portions, wherein the first layer of the dual-layer core further comprises a second tapering portion that extends from a third end to a fourth end, wherein the fourth end abuts the first end of the base portion, and wherein a width of the third tapering portion is less at the third end than at the fourth end, and wherein the width of the second tapering portion at the fourth end is configured for confinement in the front-end dielectric optical waveguide structure of at least one of the first pair of optical signals or the second pair of optical signals as a pair of orthogonally polarized optical signals.

* * * * *